US006947957B1

(12) United States Patent
Lange

(10) Patent No.: US 6,947,957 B1
(45) Date of Patent: Sep. 20, 2005

(54) PROACTIVE CLUSTERED DATABASE MANAGEMENT

(75) Inventor: Kevin Joseph Lange, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 344 days.

(21) Appl. No.: 10/177,177

(22) Filed: Jun. 20, 2002

(51) Int. Cl.[7] .................... G06F 17/30; G06F 11/00
(52) U.S. Cl. .................. 707/200; 717/127; 714/100; 714/47; 714/48
(58) Field of Search ................. 707/1–4, 100, 707/200; 717/127; 714/100–102, 25, 47–48

(56) References Cited

U.S. PATENT DOCUMENTS

2002/0163427 A1 * 11/2002 Eryurek et al. ............. 340/500
2002/0176404 A1 * 11/2002 Girard ....................... 370/352
2002/0178396 A1 * 11/2002 Wong et al. .................. 714/4
2003/0128991 A1 * 7/2003 Carling et al. ................ 399/8

* cited by examiner

Primary Examiner—Alford W. Kindred
(74) Attorney, Agent, or Firm—Alfred W. Kozak; Mark T. Starr; Lise A. Rode

(57) ABSTRACT

A method of detecting a fault or a potential fault of a DBMS operating in a clustered environment is provided. The DBMS includes a log of diagnostic information that is related to the status of the DBMS. At predetermined intervals, monitoring of the log of diagnostic information is conducted for at least one of a plurality of predefined conditions occurring anywhere in the clustered environment. The predefined conditions are related to a fault or a potential fault of the DBMS. Before a fault of the DBMS occurs, the presence of at least one of the predefined conditions in the log is detected. A response to the detected predefined condition (e.g., a fail-over) is provided.

17 Claims, 10 Drawing Sheets

PROACTIVE CLUSTERED DATABASE MANAGEMENT

TECHNICAL FIELD

The present invention relates, in general, to computers in a clustered environment, and more specifically, to the detection of a potential fault of a database management system operating in the clustered environment.

BACKGROUND OF THE INVENTION

A cluster is a set of computers that appear to be a single host computer when viewed from outside the cluster. The computers are separate processors, or nodes, which are interconnected and utilized as a single, unified computing resource.

A collection of several server computer nodes into a single, unified cluster makes it possible to share a computing load without users or clients needing to know that more than one server is involved. For example, if any resource in the cluster fails, the cluster, as a whole, may continue to offer service to clients using a resource on one of the other servers in the cluster, regardless of whether the failed component is a hardware or software resource.

Various software products are available for managing a clustered environment that includes at least two nodes. One such product, offered by Microsoft Corporation, is called Microsoft Cluster Server (MSCS). MSCS improves resource availability by allowing applications and resources to "fail-over" from a server that is not functioning correctly to another server in the cluster.

In MSCS, a cluster includes a group of nodes organized so that, if a node fails, another node may take over the failed node's resources. Communication between the nodes of the cluster enables the cluster service to detect node failures. The cluster service keeps track of the current state of the nodes within a cluster (i.e., active node or inactive node) and determines when a node and its resources should fail-over to an alternate node (after a fault of the resource to be failed-over).

In MSCS, a node typically includes a computer system running MS Windows™ NT Server, MS Windows™ 2000 Server, or MS Windows™ Net Server that is organized into a cluster. Each node manages its own groups of resources. Each group of resources runs together on the same node. When a node fails, all the resources in a group may be moved over to another node in the cluster. Such a group is also known as a fail-over group, because all the resources of the group, namely all software and hardware entities used for processing, fail-over to another node. Examples of resources are: Software Service, Software Program, Network Name, IP Address, Disk Drive, Data Base, etc.

One resource that may be included on each node of a cluster is a database management system (DBMS). A DBMS is typically a set of software programs that controls the organization, storage, and retrieval of data included in a database. The DBMS also controls the security and integrity of the database.

It is becoming increasingly desirable that DBMS environments should be available 24 hours a day, 7 days a week. This is true for both on-line and batch operations. As such, on-line transaction processing (OLTP) transactions desirably co-exists with traditional batch transactions, such as queued inserts and range updates/deletes. Therefore, it is desirable that the DBMS be constantly available, regardless of failures or faults related to the DBMS running on the cluster.

MSCS includes a health check facility known as "Looks-Alive." "Looks-Alive" is a polling facility that executes a regular probe (heartbeat) over the requisite network. The heartbeats are sent from one node in the cluster to its counterpart nodes to detect node failures. Therefore, "Looks-Alive" checks to see if the physical server or node at an opposing side of a cluster is active (i.e., able to respond).

In the event that one node in the MSCS cluster detects a communication failure with another node (via "Looks-Alive"), it broadcasts a message to the entire cluster causing all members to verify their view of the current cluster membership. This is called a regroup event. If the node manager on an individual node does not respond, the node is removed from the cluster and its active resource groups are moved to another active node.

On a two-node cluster, the node manager moves resource groups from a failed node to the surviving node. On a three- or four node cluster, the node manager may move the resource groups from the failed node to a next node. For example, the resource groups from failed node 2 may be moved in their entirety to node 3. The resource groups from failed node 3 may be moved in their entirety to node 4, and so on.

As such, MSCS includes a mechanism for determining if a DBMS on a node in a cluster has failed. Also, MSCS includes a fail-over mechanism for moving the resource groups from a failed node in the cluster to a surviving node in the cluster. In the context of a DBMS, this means that MSCS will restart the DBMS on a surviving node in the cluster in the event of a failure of the DBMS on another node in the cluster.

Unfortunately, the health check facility included in MSCS only provides the type of reactive health check described above by reference to "Looks Alive." In other words, the DBMS on a given node may have already failed by the time MSCS detects the problem. As such, critical information in the DBMS may be lost. Further, DBMS resources may be unavailable for a certain period of time during detection of the failure and the subsequent re-start.

As such, it would be desirable to have a health check facility included in a DBMS running in a clustered environment, that reduces the potential loss of information and unnecessary unavailability associated with a node or resource failure.

SUMMARY OF THE INVENTION

To meet this and other needs, and in view of its purposes, one embodiment of the present invention provides a method of detecting a fault or a potential fault of a DBMS operating in a clustered environment. The DBMS includes a log of diagnostic information that is related to the status of the DBMS. The method of detecting a fault or potential fault of DBMS includes monitoring, at predetermined intervals, the log of diagnostic information. The log of diagnostic information is monitored for at least one of a plurality of predefined conditions occurring anywhere in the clustered environment. The predefined conditions are related to a fault or a potential fault of the DBMS. The method also includes detecting, before a fault occurs in the DBMS, the presence of at least one of the predefined conditions in the log.

In another embodiment of the present invention, the method of detecting a fault or potential fault of a DBMS also includes responding to a detected predefined condition in the log with a corresponding action.

In another embodiment of the present invention, a DBMS for use in a computer cluster system is provided. The computer cluster system includes a plurality of nodes that are communicatively coupled to one another in a clustered environment. The DBMS includes a log of diagnostic information that is related to the DBMS. The DBMS also includes a utility for monitoring, at predetermined intervals, the log of diagnostic information. The utility monitors the log for at least one of a plurality of predefined conditions occurring anywhere in the clustered environment. The predefined conditions are related to a fault or a potential fault of the DBMS. The utility also detects, before a fault occurs in the DBMS, the presence of at least one of the predefined conditions in the log.

In another exemplary embodiment of the present invention, a utility for detecting a fault or a potential fault of a DBMS is provided. The utility is for use in a clustered environment that includes a plurality of nodes communicatively coupled to one another. The utility includes means for monitoring, at predetermined intervals, a log of diagnostic information. The log of diagnostic information is monitored for at least one of a plurality of predefined conditions occurring anywhere in the clustered environment. The predefined conditions are related to a fault or a potential fault of the DBMS. The utility also includes means for detecting, before a fault occurs in the DBMS, the presence of at least one of the predefined conditions in the log.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIGS. 3A–3C are connected to one another through connectors E, F, G, H, J, K, L and M;

FIGS. 4A–4B are connected to one another through connectors A and B; FIGS. 5A–5B are connected to one another through connectors C and D.

DETAILED DESCRIPTION OF THE INVENTION

Figure 1:
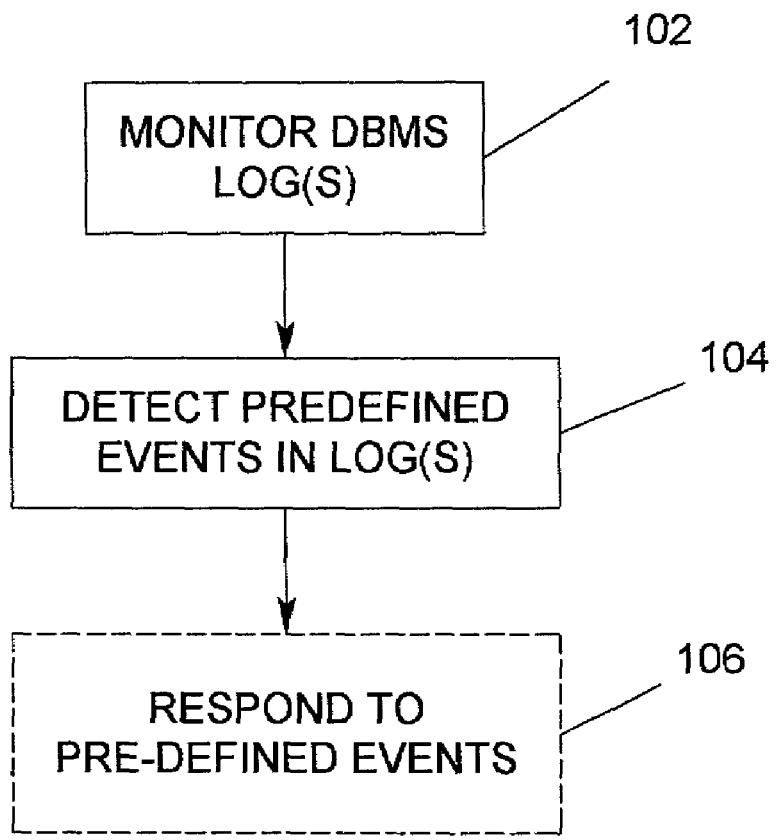
FIG. 1 is a flow diagram illustrating a method of detecting a potential fault of a DBMS in accordance with an exemplary embodiment of the present invention.

FIG. 1 illustrates a method of detecting a potential fault of a DBMS that is operating in a clustered environment. The DBMS includes a log of diagnostic information related to the status of the DBMS. For example, the log of diagnostic information may be an error log(s) used to log conditions which cause or lead to events disruptive to processing of the database.

At step 102, the DBMS diagnostic log is monitored, at predetermined intervals, for at least one of a plurality of predefined conditions. The conditions, which may occur anywhere in the clustered environment, are related to a potential fault of the DBMS. The potential fault of the DBMS may be at the node or the resource level of the DBMS. For example, the predefined condition may be a memory exception, a program variable exception, an overrun, an arithmetic/logic overflow, or a resource constraint condition (e.g., virtual memory exhaustion).

At step 104, the presence of at least one of the predefined conditions is detected in the log(s). The detection of the predefined condition in the log(s) occurs before a fault of the DBMS.

The method may optionally include step 106, in which a corresponding action is provided in response to the detected predefined condition.

The response provided in step 106 may be any of the number of appropriate corresponding actions. For example, one such response may include calling a dynamically linked library (DLL) function to direct a corrective action. Alternatively, the response may include sending a signal to at least one node of the clustered environment, where the signal is related to the detected predefined condition. Such a signal may alert a user of the node to the detected predefined condition. Alternatively, the response may include sending a signal (e.g., a page, an e-mail, etc.) to an administrator of the clustered environment, where the signal is related to the detected predefined condition. Yet another exemplary response includes providing a fail-over from a first node in the clustered environment to a second node in the clustered environment. The corrective actions recited above are exemplary in nature, and are certainly not exhaustive.

By proactively detecting a fault or potential fault of the DBMS or node, a corrective action, such as a fail-over, can be proactively implemented. As such, unavailability of the DBMS can be substantially reduced or eliminated. Further, potential data loss may also be substantially reduced or eliminated. These benefits are particularly evident when comparing this proactive corrective action to a reactive corrective action, such as a forced fail-over subsequent to a DBMS (e.g., "Looks-Alive").

In the case of a forced fail-over, the proactive detection method may provide a significant reduction in the auto recovery time as compared to a forced fail-over that occurs without the proactive detection method. As such, the end user may never know that the DBMS was experiencing an operational problem.

In an exemplary embodiment of the present invention, the clustered environment is managed using Microsoft Cluster Services (MSCS). Further, the method of detecting a potential fault of the DBMS may be implemented through the use of a structured query language (SQL) program. For example, the DBMS may be a software application such as SQL/Server. Therefore, in an exemplary embodiment of the present invention, the method of detecting a potential fault of a DBMS is implemented through an SQL utility running in SQL/Server, where SQL/Server operates in a clustered environment managed under MSCS.

In one exemplary embodiment of the present invention the error log in the DBMS is a pre-existing error log whereby each of the potential fault conditions is defined by the DBMS application. In another exemplary embodiment of the present invention the error log may be customized to include user defined potential faults, events or conditions.

Figure 2A:
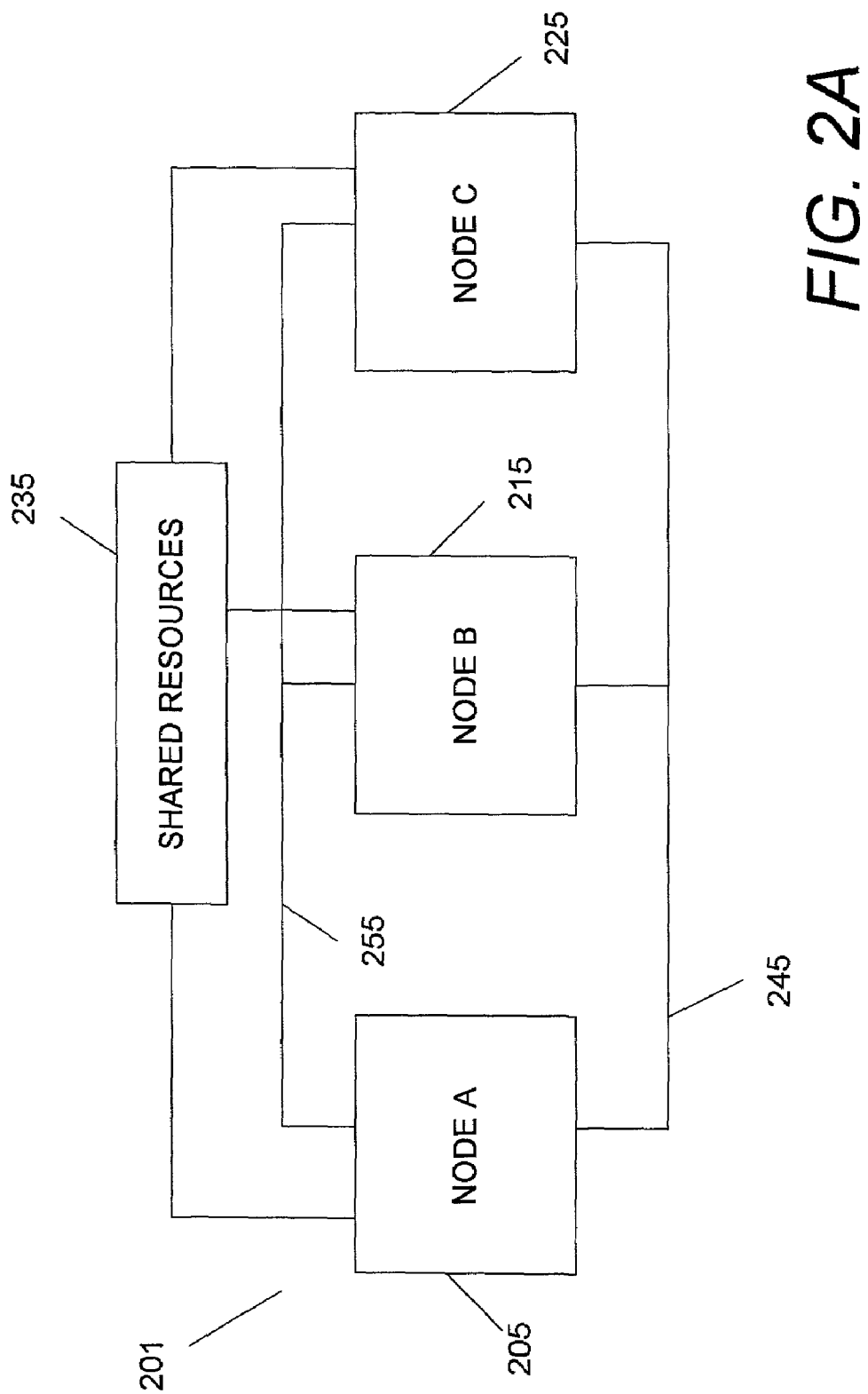
FIG. 2a is a block diagram of a clustered environment in accordance with an exemplary embodiment of the present invention.

FIG. 2a illustrates a clustered environment in accordance with an exemplary embodiment of the present invention. Cluster 201 includes node A 205, node B 215, and node C 225. Node A 205, node B 215, and node C 225 are communicatively coupled to one another through public network 245, and through private network 255. Each of the nodes 205, 215, and 225 also utilize certain shared resources 235 in the clustered environment 201. An installed DBMS (not shown) is included at each of the nodes 205, 215, and 225. The DBMS includes a log of diagnostic information related to the DBMS (e.g., error log), and a utility operates on each node in the cluster 205, 215 and 225 to monitor the log for one of a plurality of predefined events or conditions. Each of the plurality of predefined events or conditions is related to a potential fail-over of the DBMS. While monitoring the DBMS log of diagnostic information, one of the predefined events may be detected. For example, the detected predefined condition or event may be a potential failure of node A 205, or a potential failure of the DBMS running on node A 205. In such a situation, a corrective action or response to the detected predefined condition may be to provide a is fail-over from node A 205 to node B 215. Through such a response, all of the DBMS resources running on node A 205 could be transferred to node B 215.

Because the potential fault of the DBMS is detected before an actual fault occurs (i.e., proactively), the fail-over to node B 215 reduces unavailability of the DBMS, and also reduces any potential data loss.

In an exemplary embodiment the potential fault detection method is implemented using an SQL utility developed by Unisys known as the CLAD/SQL utility. The CLAD/SQL utility operates in a SQL/Server environment along with the Unisys Cluster Application Defender (CLAD) software. For example, the CLAD/SQL utility is used to detect a potential fault condition in the DBMS, and the additional CLAD software may be used to carry out corrective actions relative to the DBMS (e.g., fail-over). As such, upon the detection of a given potential fault condition, a DLL call may be made to trigger the CLAD software to carry out an appropriate corrective action. The CLAD software operates independent of the present invention which is related to the CLAD/SQL utility in the present embodiment.

Figure 2B:
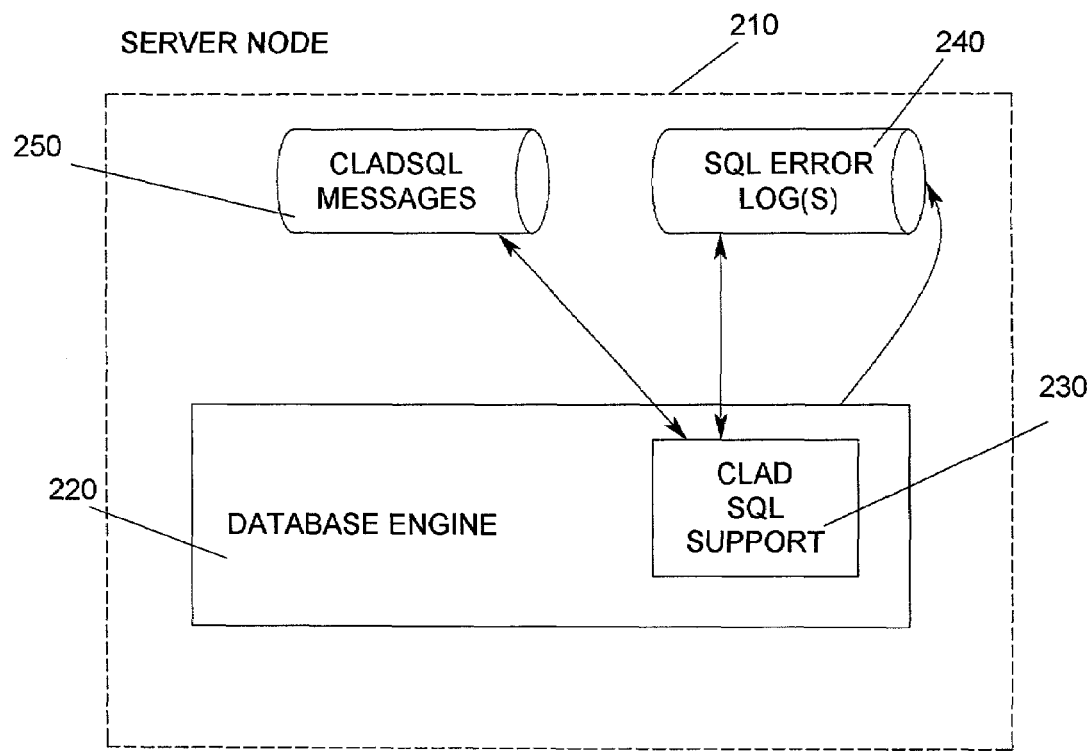
FIG. 2b is a block diagram of a server node included in a clustered environment in accordance with an exemplary embodiment of the present invention.

FIG. 2b illustrates an exemplary server node 200 that operates in a clustered environment, such as node A 205, node B 215, and node C 225 illustrated in FIG. 2a. Server node 200 includes database engine 220. In the embodiment illustrated in FIG. 2, database engine 220 includes CLAD/SQL support utility 230. Database engine 220 also includes numerous additional elements not shown in FIG. 2b.

CLAD/SQL support utility 230 is a set of SQL code that provides proactive fault detection of the DBMS (also included in database engine 220). During execution of the proactive detection method, the CLAD/SQL support utility 230 reads the content of the current SQL error log 240. SQL error log 240 is typically a continuously updated log of diagnostic data related to the operation of the DBMS. Also, during the execution of the proactive detection is method, the CLAD/SQL support utility reads the contents of the CLAD/SQL message file 250. The CLAD/SQL message file 250 includes entries related to any of a number of predefined conditions that may appear in the SQL error log 240. The entries may be pre-existing (relative to the DBMS) or may be user customized. Further, severity levels and potential corrective actions for the predefined conditions may also be included in the CLAD/SQL message file 250. The CLAD/SQL support utility 230 then compares the contents of the SQL error log 240 with the CLAD/SQL message file 250 to determine if a predefined condition related to a potential fault of the DBMS exists. Thereafter, the CLAD/SQL support utility 230 may initiate an appropriate corrective action or response to the predefined condition being detected.

The appropriate corrective action may be a fail-over of database resources from node 210 to another node in the cluster. As indicated above, CLAD/SQL support utility 230 preferably works in conjunction with the additional CLAD software (not shown in FIG. 2b) to manage corrective actions in response to a potential fault being detected. For example, the CLAD software may be used to manage a fail-over from a first node in the cluster to a second node in the cluster, and/or may interact with the operating system to issue an alert related to the potential fault condition.

Figure 3A:
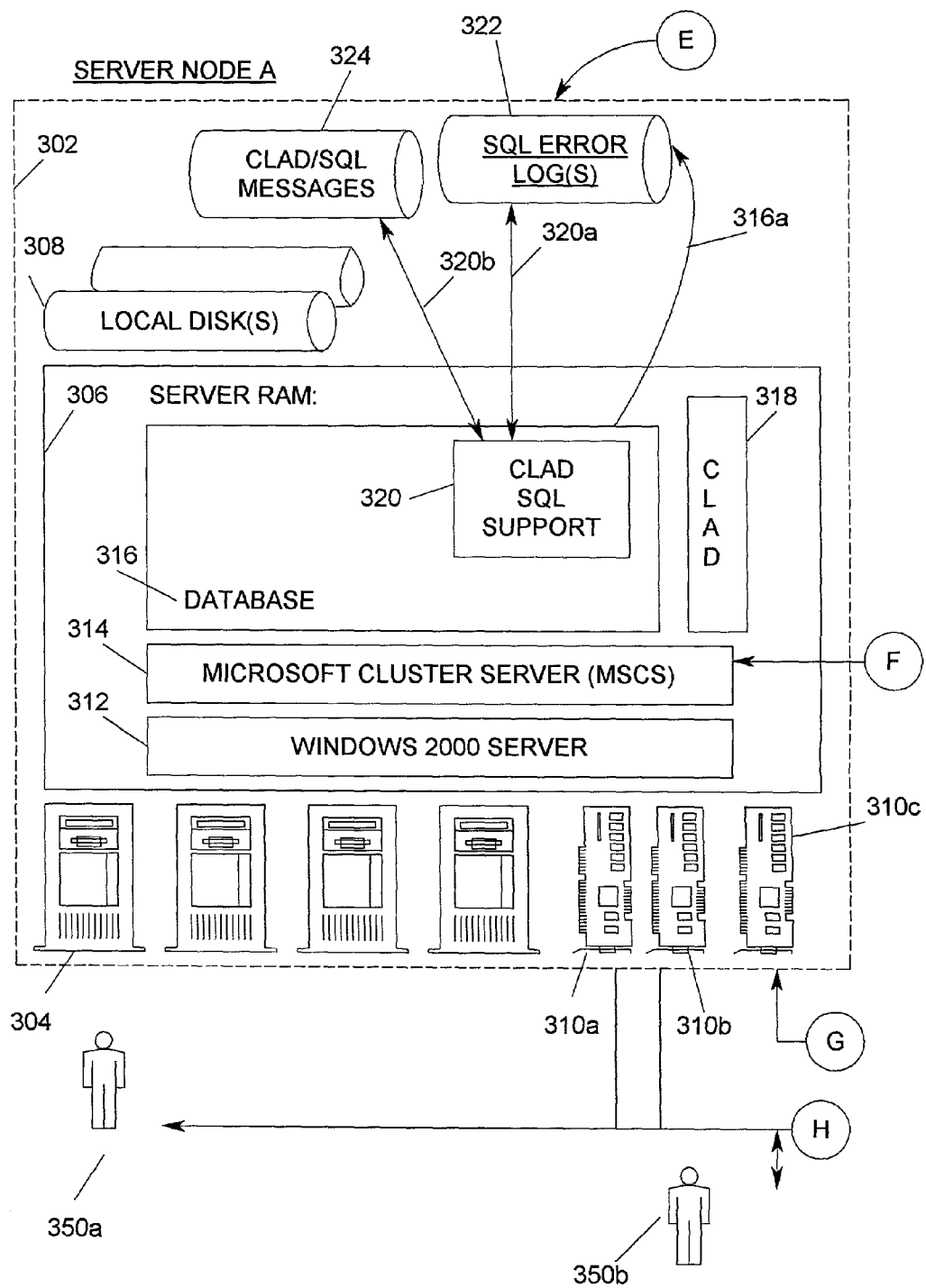
FIGS. 3A–3C are block diagrams of a clustered environment in accordance with an exemplary embodiment of the present invention.
Figure 3B:
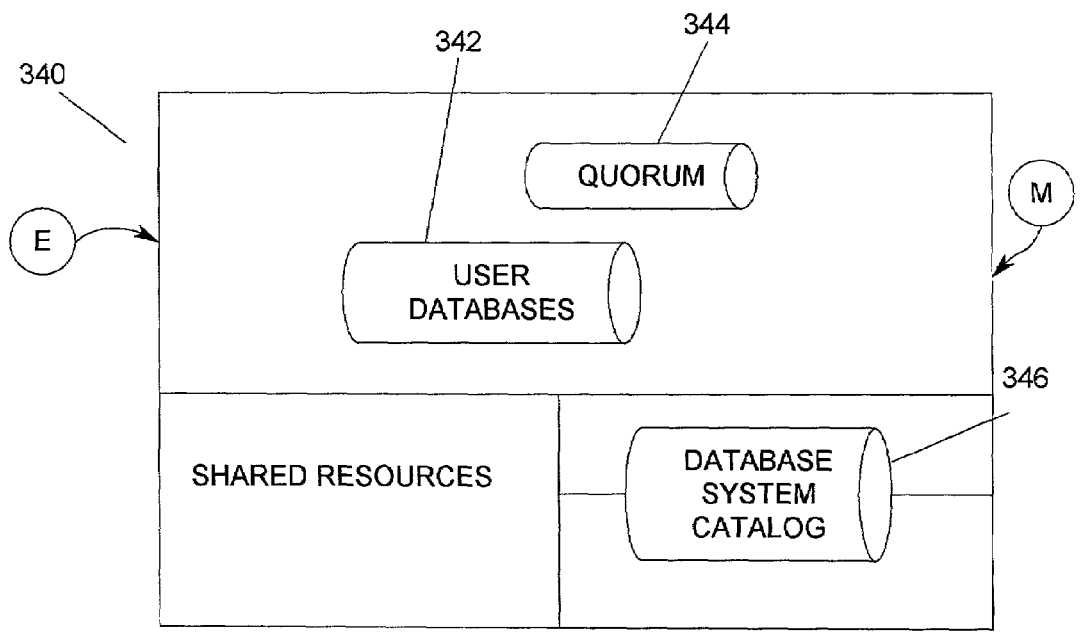
Figure 3B:
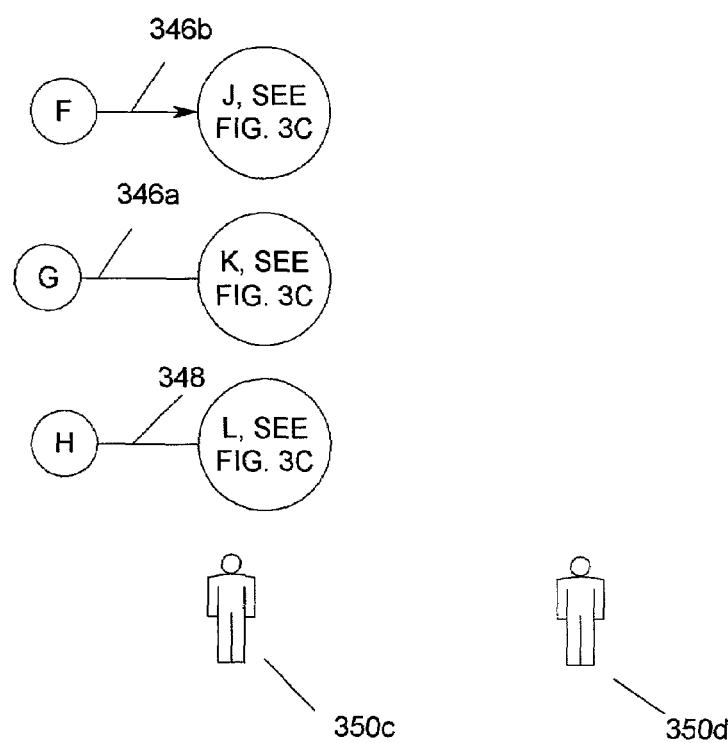

FIGS. 3A–3B illustrate a clustered environment including server node A 302 and server node B 352. Each of the nodes 302 and 352 include numerous local hardware and software resources. For example, node A 302 includes hardware resources such as central processing units 304, random access memory 306, local disk drive units 308, and network interface cards 310a, 310b, and 310c. Server node A also includes software resources such as the Windows operating system 312, MSCS 314, and database engine 316.

Database engine 316 (e.g., SQL/Server) includes the code executing the DBMS functionality. Database engine 316 may also include a task management facility, although this facility may be integrated into the operating system depending upon the DBMS being used. The exemplary database engine 316 also has a local disk storage area (not shown) for logging error and diagnostic messages during operation of the DBMS. During normal operation, error and diagnostic messages may be written from database engine 316 to SQL error log 322 as illustrated through process arrow 316A.

Server node B 352 includes similar hardware and software resources. For example, server node B 352 includes hardware resources such as central processing units 354, random access memory 356, local disk drive units 358, and network interface cards 360A, 360B, and 360C. Server node B 352 also includes software resources such as Windows operating system 362, MSCS 364 and database engine 366. Database engine 366 also includes a local disk storage area (not shown) for logging error and diagnostic messages during operation of the DBMS. The error and diagnostic messages are written from database engine 366 to SQL error log 372 as illustrated through process arrow 366A.

Server node A 302 and server node B 352 share certain common resources 340 (illustrated via connectors E and M). Shared resources 340 include quorum file 344, which contains shared clustered state data. Shared resources 340 also includes common database control structures, such as the system catalog 346. Further, shared resources 340 also include shared user databases 342.

Figure 3C:
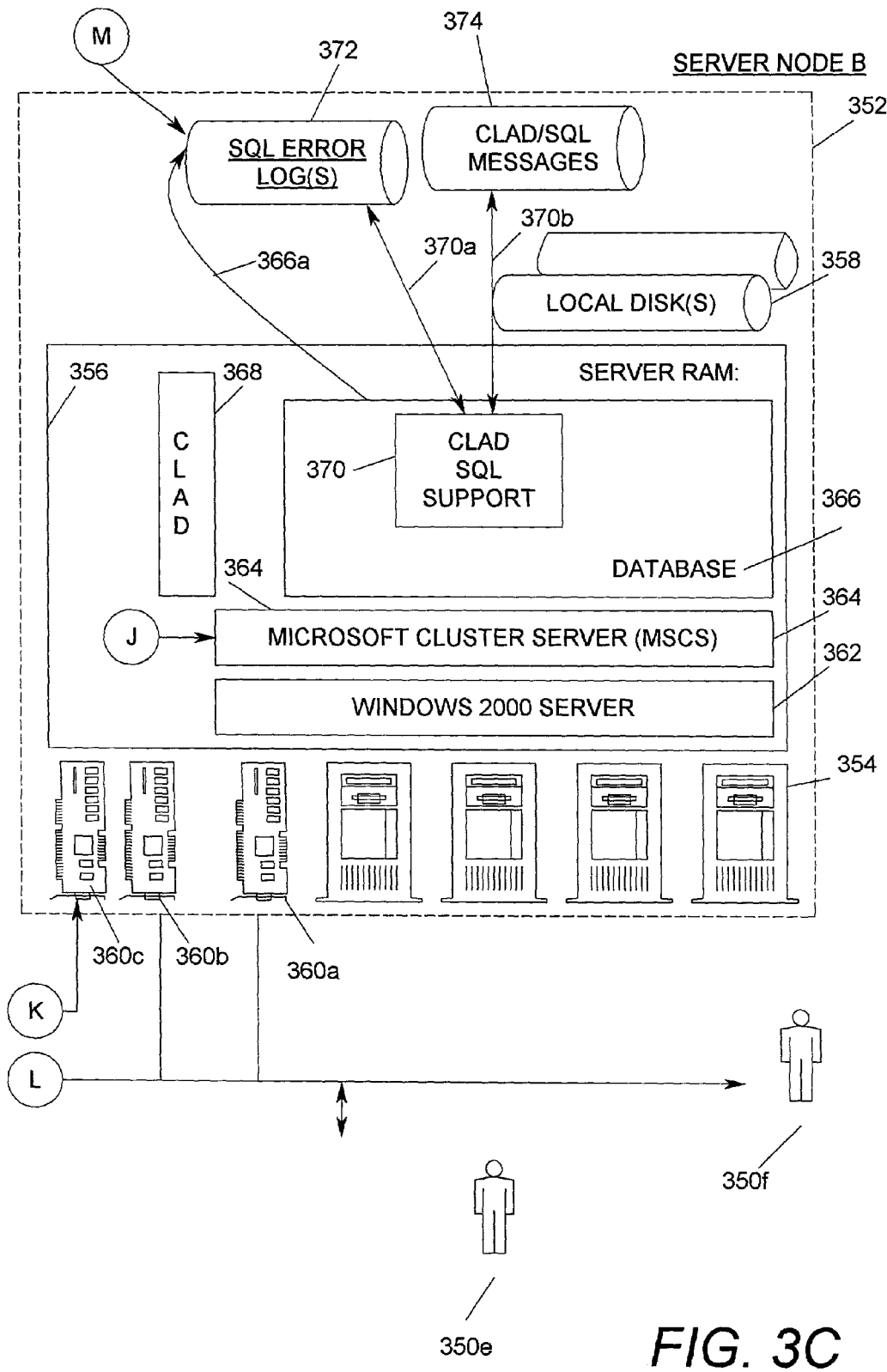

In the embodiment illustrated in FIGS. 3A–3C, the clustered environment is managed using MSCS. In an MSCS environment, at least two distinct and separate networks may be used. For example, server node A 302 and server node B 352 each connect to at least one public network 348. For example, public network 348 may be an IP network running a standard TCP/IP protocol. As such, an IP stack may be running on each server node and on each client environment.

As shown in FIGS. 3A–3B, server node A 302 connects to public network 348 through network interface cards 310a and 310b (illustrated via connector H). Similarly, as shown in FIGS. 3B–3C, server node B 352 connects to public network 348 using network interface cards 360a and 360b (illustrated via connector L). As shown in FIGS. 3A–3C, numerous users 350a, 350b, 350c, 350d, 350e, and 350f may access public network 348.

Additionally, at least one private network 346 (illustrated as 346A and 346B) connects server node A 302 and server node B 352. Server node A 302 connects to private network 346A through network interface card 310C (illustrated via connector G). Similarly, server node B 352 connects to private network 346A using network interface card 360C (illustrated via connector K). The private network serves the purpose of transmitting a "heartbeat" pulse between server node A 302 and server node B 352.

During normal MSCS processing, a regular probe (i.e., the "heartbeat") is executed over private network 346a. This process is known in MSCS as "Looks-Alive."

"Looks-Alive" determines if servers or nodes connected to the cluster are active. For example, "Looks-Alive" determines if a node is responding to a network information center (NIC) request over the private network 346. Further, "Looks-Alive" determines if each of the nodes or servers is running MSCS. As such, "Looks-Alive" is a basic health check illustrated on private network 346A. "Looks-Alive" is a relatively quick and inexpensive health check, and is therefore executed often to check for the existence of an attached node on a MSCS cluster. However, "Looks-Alive" only determines whether a given node is active or inactive. As such, "Looks-Alive" is a reactive health check, and not a proactive health check. In other words, by the time "Looks-Alive" detects a fault condition relative to a DBMS, the failure has already occurred. As such, data resources may be permanently lost, and the DBMS may be unavailable during a forced fail-over to another node in the cluster.

Another standard MSCS health check facility, illustrated in FIGS. 3A–3C on private network 346B (illustrated via connectors F and J), is the "Is-Alive" process/routine. Each time the "Is-Alive" routine is called on private network 346B, an implicit "Looks-Alive" check is first completed. Thereafter, the diagnostic "Is-Alive" process includes physically checking for availability and a response from each and every clustered resource listed within the MSCS environment. The "Is-Alive" process is effective in reacting to failed clustered resources by initiating standard MSCS retry processing, or standard MSCS fail-over processing. However, similar to the "Looks-Alive" utility, "Is-Alive" is a reactive process, and not a proactive failure detection system.

Because the "Is-Alive" process may use substantially more time in processing resources than the "Looks-Alive" process, "Is-Alive" is typically executed much less frequently than "Looks-Alive".

In the DBMS context, when the "Is-Alive" process determines that a specific clustered resource has failed, then an appropriate response to the failed resource may be an MSCS fail-over. After the fail-over a database auto-recovery is typically executed. Accordingly, the DBMS may be unavailable for a prolonged period during the fail-over and subsequent auto-recovery.

As shown in FIG. 3A, the exemplary server node A 302 includes CLAD software 318 in server RAM 306. As shown in FIG. 3C, the exemplary server node B 352 similarly includes CLAD software 368 in server RAM 356. The CLAD software installed on each of the server node runs in conjunction with MSCS to provide enhanced monitoring and management capabilities that are often required for enterprise class processing and environments.

Database engine 316 and server node A 302 also include CLAD/SQL support utility 320. This utility 320 is a set of SQL code driven by the task management facility included in database engine 316 (not shown). At predetermined intervals (e.g., one minute, five minutes, ten minutes, etc.) the task management facility begins execution of the CLAD/SQL support utility. The CLAD/SQL support utility 320 reads from SQL error log 322 the current database error log. This process is illustrated in FIG. 3A as process arrow 320A. Further, the CLAD/SQL support utility 320 reads the contents of the CLAD/SQL message file 324. This process is represented in FIG. 3A as process arrow 320B. If a comparison of the contents of SQL error log 322 and CLAD/SQL message file 324 indicates that there is a potential fault of the DBMS, then the CLAD/SQL support utility 320 may initiate an appropriate corrective action. For example, this corrective action may be a fail-over from a first node 302 in the cluster to a second node 352 in the cluster. This corrective action may thereafter be managed by the CLAD software 318.

Similarly, server node B 352 includes CLAD/SQL support utility 370. At a predetermined interval, CLAD/SQL support utility 370 reads the contents of SQL error log 372. This process is illustrated in FIG. 3C as process arrow 370A. Additionally, CLAD/SQL support utility 370 reads the contents of CLAD/SQL message file 374. This process is illustrated in FIG. 3C as process arrow 370B. CLAD/SQL support utility 370 then compares the contents of SQL error log 372 and CLAD/SQL message file 374 to determine if a predefined condition, indicating a potential fault of the DBMS, is present. If the CLAD/SQL support utility 370 determines that a predefined condition is present, then the CLAD/SQL support utility 370 may initiate an appropriate corrective action.

The CLAD/SQL utility may be executed on a single server node in a cluster, or may be executed on each server node in the cluster. For example, in an active/passive clustered environment, only a single server node may be running the database service (including SQL/Server). Therefore, additional node(s) in the cluster are passive. In such a configuration, the CLAD/SQL utility may be executed only on the single active server node in the cluster. Alternatively, in an active/active clustered environment, each server node may be running the database service. In this configuration, the CLAD/SQL utility may be executed on each server node in the cluster.

Figure 4A:
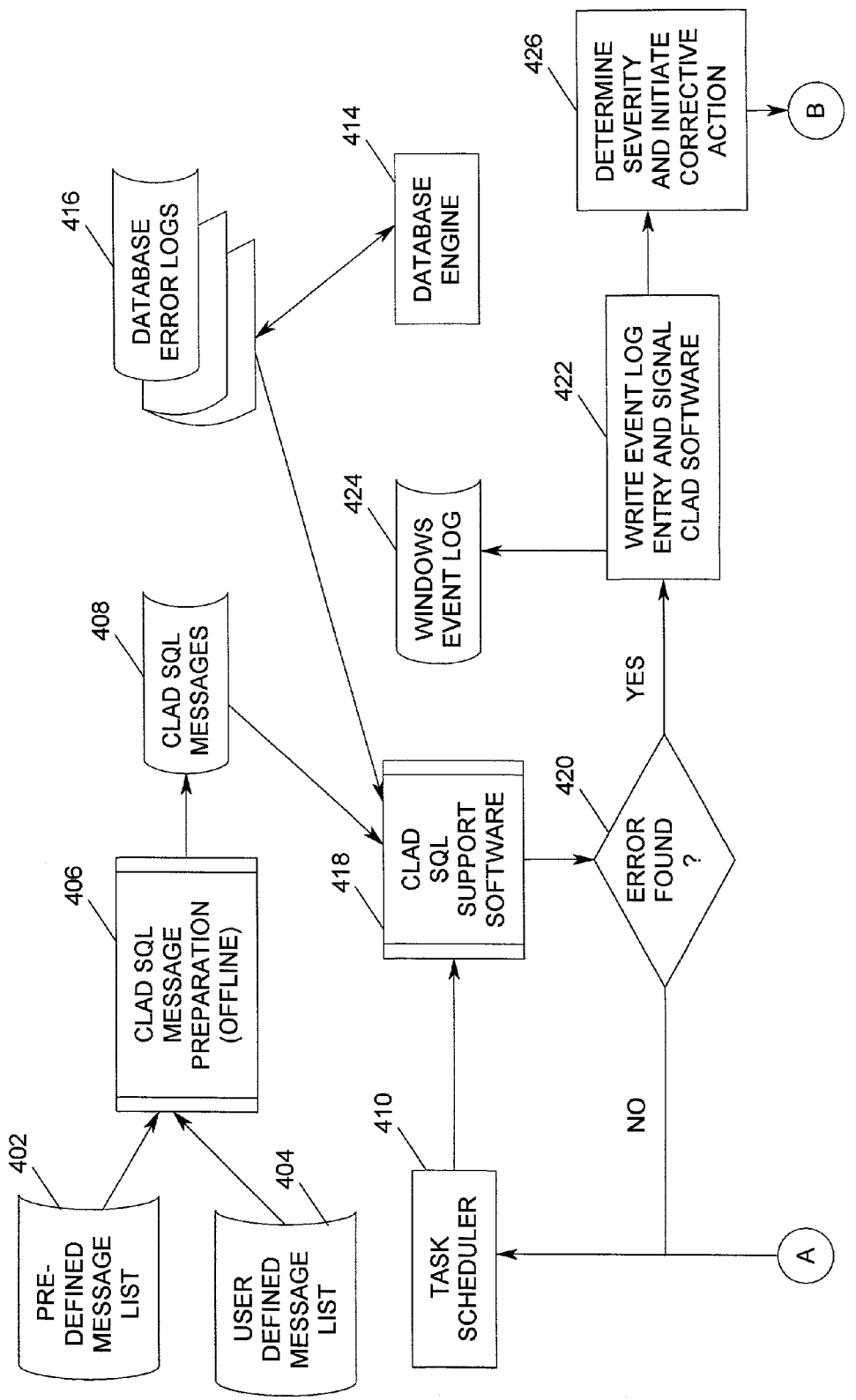
FIGS. 4A–4B are process logic flow diagrams illustrating a method of detecting a potential fault in a DBMS in accordance with an exemplary embodiment of the present invention.
Figure 4B:
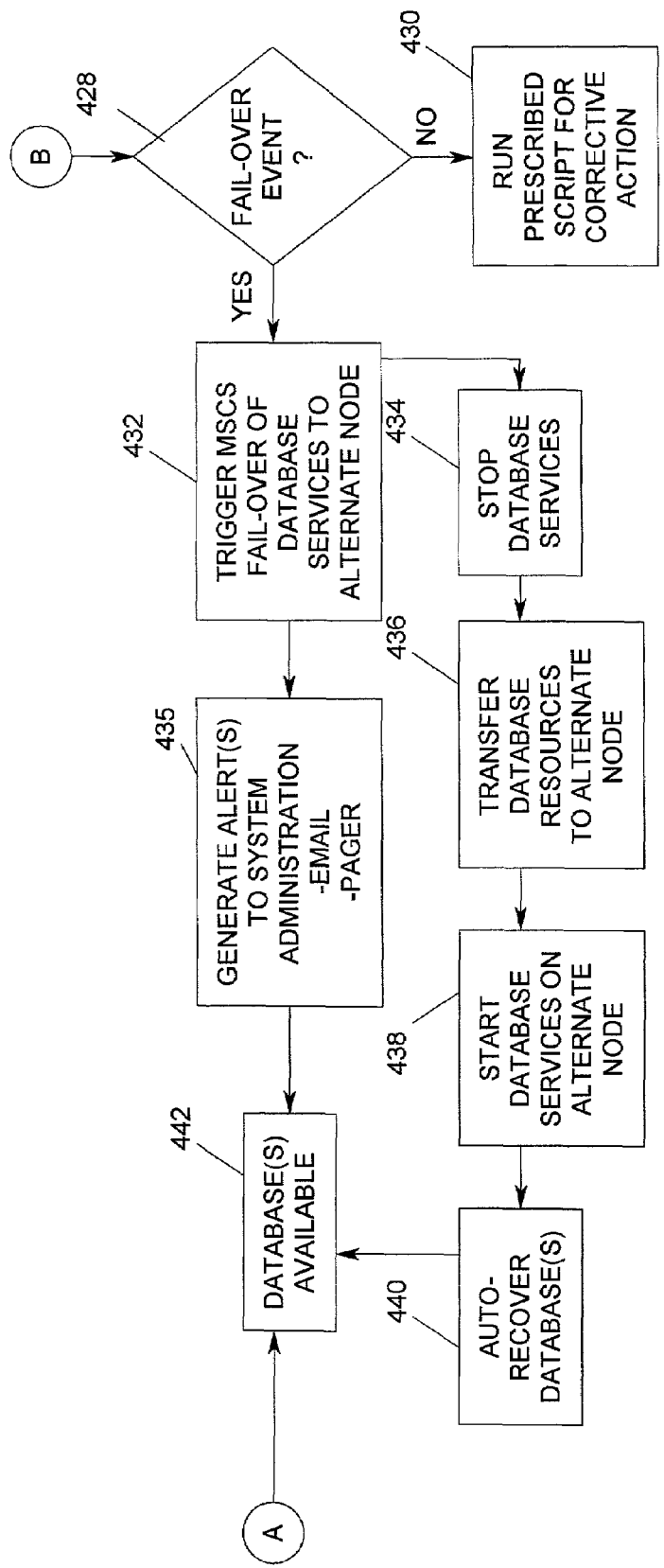

FIGS. 4A–4B illustrate a process logic flow diagram in accordance with an exemplary embodiment of the present invention. Steps 402–408 illustrate the process logic flow steps used to prepare the message file for use in a file such as CLAD/SQL message file 324 illustrated in FIG. 3A. The message file preparation process relates to the formatting and compiling of a list of potential database error conditions. For example, the compiled database error conditions may include pre-existing database error conditions identified and defined by the DBMS (e.g., SQL/Server). This list of known database error conditions is illustrated in FIG. 4A as a predefined message list compiled at step 402. Predefined message list (step 402) may include error messages which are indicative of a catastrophic, or soon to be catastrophic conditions within the DBMS. These error messages are typically specific to the particular DBMS utilized in the clustered environment.

The compiled DBMS error condition list created during the message preparation process also may include user defined error conditions. For example, a user may provide custom error messages which may ultimately provide customized reactions or responses. Further, the user defined error conditions may include programmatically generated messages. The user defined error conditions are compiled in the user defined message list at step 404. Step 406 represents the CLAD/SQL message preparation step, which entails the formatting and compilation of the predefined message list (step 402) and the user defined message list (step 404). After the message preparation process has been completed at step 406, the combined predefined and user defined message file is placed in a predefined location on disk, as shown at step 408. During operation of the CLAD/SQL diagnostic utility, the combined predefined and user defined message file may be read from its location on disk. This location is customizable, for example, during the CLAD installation.

At predetermined intervals, the CLAD/SQL support utility is executed. For example, the predetermined interval may be every one minute, every five minutes, or every ten minutes. At each of the predetermined intervals, the task scheduler, at step 410, initiates the CLAD/SQL support utility. After initialization the CLAD/SQL support utility proceeds to step 418.

Prior to the execution of the CLAD/SQL support software at step 418, the database engine, at step 414, prepares the update for the database error log. Then, at step 416, the database engine updates the database error logs at step 418. During operation of the CLAD/SQL support software execution at step 418, information is provided to the CLAD/SQL support software from the database error log(s) (from step 416), and the CLAD/SQL message list (from step 408). Specifically, at step 418, the CLAD/SQL support utility reads the current diagnostic messages from the database error log 416. Further, the CLAD/SQL support utility reads the CLAD/SQL messages into memory from the designated location of the CLAD/SQL message list 408. During the execution of the CLAD/SQL support software utility, the data retrieved from the database error log is compared to the CLAD/SQL message list. This comparison is illustrated at decision step 420 in FIG. 4A. For example, if a match is found between the database error log and the CLAD/SQL message list, then decision step 420 is answered affirmatively. If no match is found during the comparison of the database error log and the CLAD/SQL message list, then decision step 420 is answered in the negative.

If decision step 420 is answered in the negative, then the utility awaits the next iteration of the task scheduler at step 410.

If decision step 420 is answered affirmatively, then the utility proceeds to step 422. During step 422 the CLAD software is signaled. Also, during step 422, an entry is formatted, and thereafter written to the Windows event log at step 424.

At step 426, the severity of the predefined condition (the match between the database error log and the CLAD/SQL message list) is determined. Further, a corrective action is initiated. For example, step 426 initiates decision step 428 (illustrated via connector B), which determines if a fail-over is the appropriate corrective action. If a fail-over from a first node to a second node in the cluster is not the appropriate corrective action, then a prescribed script for a customized corrective action may be run at step 430. If a fail-over from a first node in the cluster to a second node in the cluster is the appropriate corrective action, then a MSCS fail-over is triggered at step 432. The fail-over process triggered at step 432 results in the database services being stopped at step 434. Subsequently, the appropriate database resources are transferred to an alternate node in the cluster at step 436. Thereafter, the database services are started on the alternate node at step 438. At step 440, the auto-recovery of the database(s) is executed.

In an alternative exemplary embodiment of the present invention, the CLAD software may additionally generate an alert to a system administrator at step 435 following the trigger of the fail-over at step 432. This alert to the system administrator may take any of a number of conventional forms, including an e-mail or a paging alert.

Following the execution of the auto-recovery of the database at step 440, the particular recovered databases are on-line and available for processing at step 442. As such, the present interval of the CLAD/SQL support utility is complete and awaits the next iteration of the task scheduler at step 410 (illustrated via connector A).

Figure 5A:
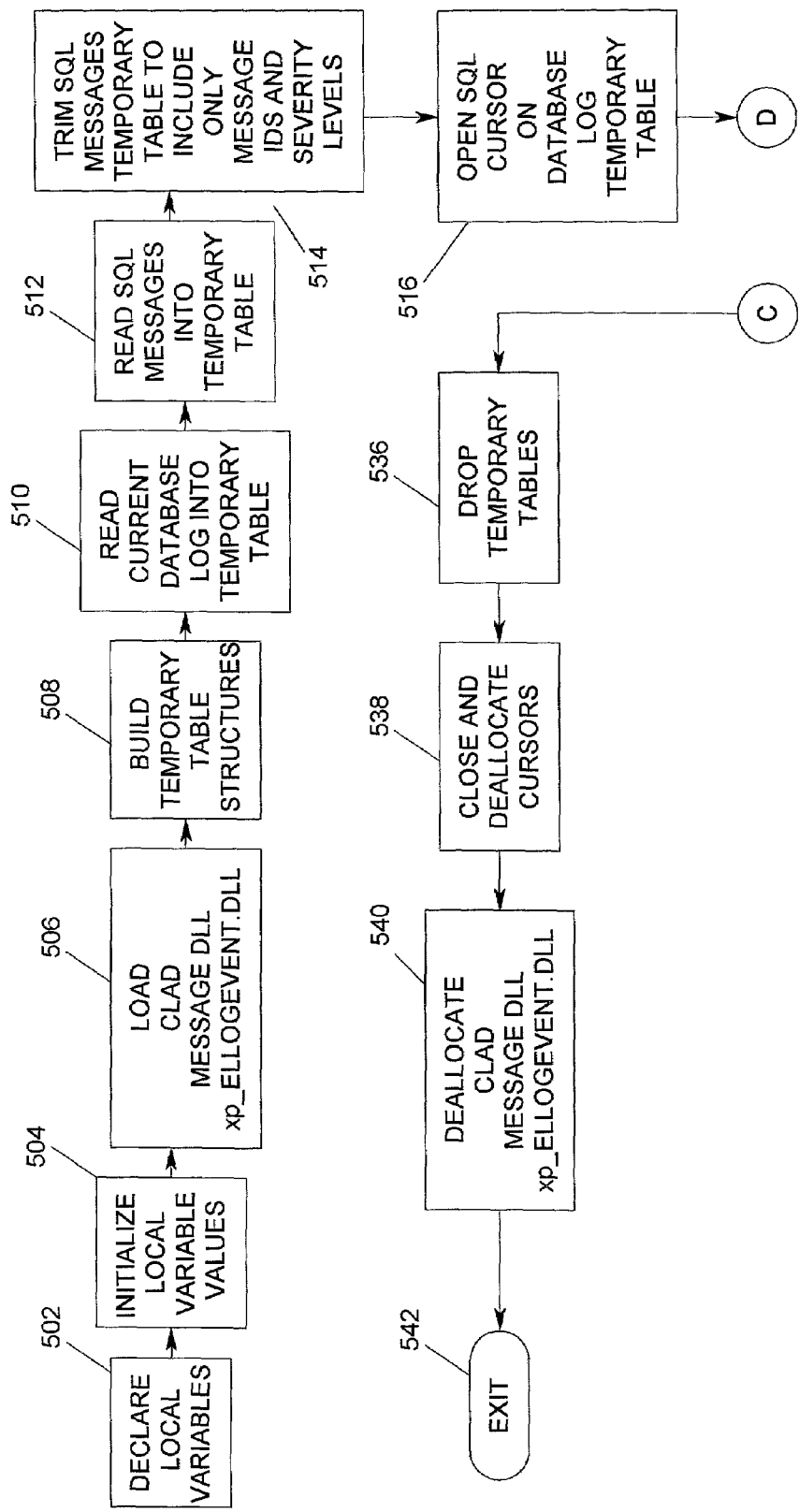
FIGS. 5A–5B are code logic flow diagrams illustrating a method of detecting a potential fault in a DBMS in accordance with an exemplary embodiment of the present invention.
Figure 5B:
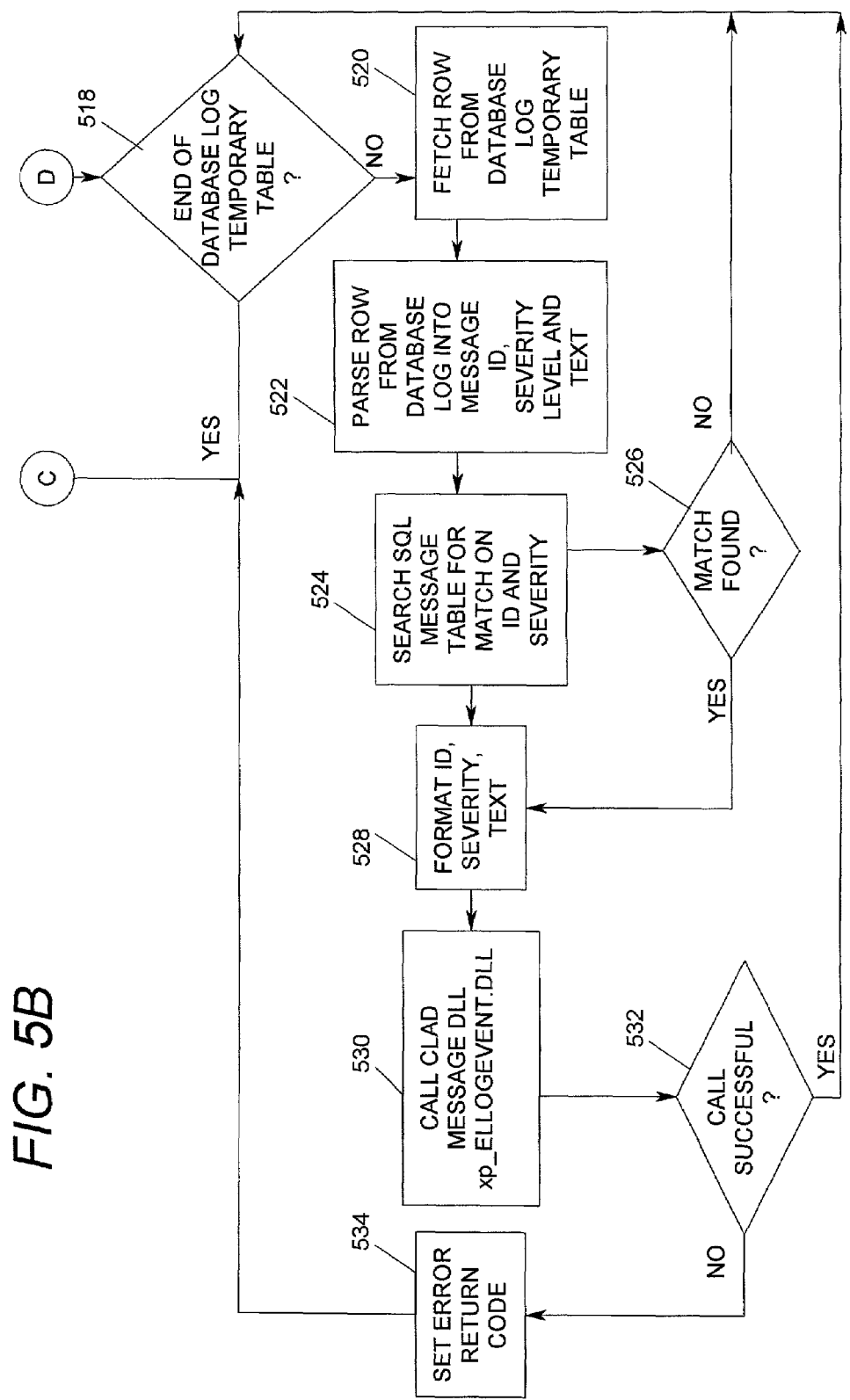

FIGS. 5A–5B illustrate a code logic flow diagram of the CLAD/SQL support software in accordance with an exemplary embodiment of the present invention. At step 502 local variables are declared in the code. At step 504 the local variables declared are then initialized with appropriate values. At step 506, the CLAD message DLL is loaded into the database context. At step 508, temporary table structures are built to store the CLAD/SQL message data, and the database diagnostic log data (e.g., error logs). At step 510, the current database log is read into the database log temporary table built during step 508. At step 512 the CLAD/SQL messages are read into the SQL message temporary table. At step 514, the CLAD/SQL messages are trimmed in the SQL message temporary table to include only relevant information, such as message IDs and the respective severity level of the messages. During step 516, an SQL cursor is opened on the database log temporary table.

At step 518 a looping iteration is commenced (illustrated via connector D), which searches for the end of the database log temporary table. As long as the end of the database log temporary table has not been reached during the loop, the process logic will proceed to step 520. At step 520, a row is fetched from the database log temporary table. The row fetched from the database log temporary table is then parsed into message ID, severity level, and message text at step 522. Thereafter, the SQL message temporary table is searched for a match of both the message ID and severity at step 524.

If a match is found at decision step 526, then the message ID, message severity level, and message text are formatted at step 528. At step 530, the CLAD message DLL is called, passing the message ID, severity level, and message text.

If the CLAD message DLL call is successful at decision step 532, then the next row in the database log temporary table is evaluated at step 518. If the CLAD message DLL call is not successful at step 532, then an error return code is set for exit of the process at step 534.

If a match is not found at decision step 526, then the next row in the database log temporary table is evaluated at step 518.

Upon the completion of the main looping iteration (an answer of yes at decision step 518), the database log and SQL message temporary table are dropped at step 536 (illustrated via connector C). Thereafter the cursor created on the database log temporary table is closed and de-allocated at step 538. At step 540 the CLAD message DLL is also de-allocated. The utility is exited at step 542.

The control function for monitoring, at predetermined intervals, the log of diagnostic information may be accomplished in any of a number of ways. For example, it is contemplated that this function may be accomplished through a software routine. However, it is understood that the control function for monitoring the log of diagnostic information may be accomplished in software, hardware, or a combination of software and hardware.

The control function for monitoring, at predetermined intervals, the log of diagnostic information may be accomplished in any of a number of ways. For example, it is contemplated that this function may be accomplished through a software routine. However, it is understood that the control function for monitoring the log of diagnostic information may be accomplished in software, hardware, or a combination of software and hardware.

Although the present invention has been herein described largely by reference to a cluster environment managed by MSCS, the present invention is applicable to any clustered environment.

Although SQL/Server has been described herein repeatedly as an example of the DBMS used in connection with the present invention, the present invention is applicable to any DBMS. For example, the present invention is applicable to Oracle, DB2, and other database management systems.

Although the proactive fault detection utility described herein has been described as a fixed utility to the clustered environment, it is contemplated that the proactive fault detection utility may be an optional feature of the clustered environment. For example, a hardwired switch at a server may be utilized to enable or disable the proactive fault detection utility. Alternatively, a software switch may be used to enable or disable the proactive fault detection utility.

Although the present invention has been described in terms of hardware and software, it is contemplated that the invention could be implemented entirely in software on a computer readable carrier such as a magnetic or optical storage medium, or an audio frequency carrier or a radio frequency carrier.

Although illustrated and described herein with reference to certain specific embodiments, the present invention is nevertheless not intended to be limited to the details shown. Rather, various modifications may be made in the details within the scope and range of equivalence of the claims and without departing from the spirit of the invention.

What is claimed:

1. A method of detecting and responding to a potential fault of a database management system operating in a clustered environment, the database management system including a log of diagnostic information related to the status of the database management system, the method comprising the steps of:
    monitoring, at predetermined intervals, the log of diagnostic information for at least one of a plurality of predefined conditions, occurring anywhere in the clustered environment, the conditions being related to a potential fault of the database management system;
    detecting, before a fault of the database management system occurs, the presence of at least one of the predefined conditions in the log; and
    responding to the detected predefined condition with a corresponding action, wherein said corresponding action includes providing a fail-over from a first node in the clustered environment to a second node in the clustered environment before a fault of the database management system occurs.

2. The method of claim 1 wherein the responding step includes calling a dynamically linked library function to direct the corrective action.

3. The method of claim 1 wherein the responding step includes sending a signal to at least one node of the clustered environment, the signal being related to the detected predefined condition.

4. The method of claim 1 wherein the responding step includes sending a signal to an administrator of the clustered environment, the signal being related to the detected predefined condition.

5. The method of claim 1 wherein the method includes using a structured query language (SQL) program included in the database management system in performing the steps of monitoring, detecting and responding.

6. The method of claim 1 additionally comprising the step of managing the clustered environment using Microsoft Cluster Services (MSCS).

7. The method of claim 1 wherein the database management system includes a step of entering the diagnostic information into the log, the method further comprising the step of entering user defined diagnostic information into the log.

8. The method of claim 1 additionally comprising the step of comparing the detected predefined condition against a condition list to determine an appropriate response to the detected predefined condition.

9. A computer readable carrier including computer program instructions which cause a computer to implement a method of detecting and responding to a potential fault of a database management system operating in a clustered environment, the database management system including a log of diagnostic information related to the status of the database management system, the method comprising the steps of:
    monitoring, at predetermined intervals, the log of diagnostic information for at least one of a plurality of predefined conditions, occurring anywhere in the clustered environment, the conditions being related to a potential fault of the database management system;
    detecting, before a fault of the database management system occurs, the presence of at least one of the predefined conditions in the log; and
    responding to the detected predefined condition with a corresponding action, wherein said corresponding action includes providing a fail-over from a first node in the clustered environment to a second node in the clustered environment before a fault of the database management system occurs.

10. A database management system for use in a computer cluster system, the computer cluster system including a plurality of nodes communicatively coupled to one another in a clustered environment, the database management system comprising:
    a log of diagnostic information related to the database management system; and
    a utility for monitoring, at predetermined intervals, the log of diagnostic information for at least one of a plurality of predefined conditions, occurring anywhere in the clustered environment, the conditions being related to a potential fault of the database management system, and for detecting, before a fault of the database management system occurs, the presence of at least one of the predefined conditions in the log;

said utility responding to the detected predefined condition with a corresponding action, said corresponding action including providing a fail-over from a first node in the clustered environment to a second node in the clustered environment before the fault of the database management system occurs.

11. A utility for detecting and responding to a potential fault of a database management system for use in a computer cluster system, the computer cluster system including a plurality of nodes communicatively coupled to one another in a clustered environment, the utility comprising:

means for monitoring, at predetermined intervals, a log of diagnostic information for at least one of a plurality of predefined conditions, occurring anywhere in the clustered environment, the conditions being related to a potential fault of the database management system;

means for detecting, before a fault of the database management system occurs, the presence of at least one of the predefined conditions in the log; and means for responding to the detected predefined condition with a corresponding action, said corresponding action including providing a fail-over from a first node in the clustered environment to a second node in the clustered environment before the fault of the database management system occurs.

12. The utility of claim 11 wherein the means for responding includes means for calling a dynamically linked library function to direct the corrective action.

13. The utility of claim 11 wherein the means for responding includes means for sending a signal to at least one node of the clustered environment, the signal being related to the detected predefined condition.

14. The utility of claim 11 wherein the means for responding includes means for sending a signal to an administrator of the clustered environment, the signal being related to the detected predefined condition.

15. The utility of claim 11 wherein Microsoft Cluster Services (MSCS) software is installed on each of the nodes, and the MSCS software is used to management the clustered environment.

16. The utility of claim 11 wherein the means for responding provide a fail-over from a first node in the clustered environment to a second node in the clustered environment.

17. The system of claim 11 further comprising comparison means for comparing the detected predefined condition to a condition list in order to determine an appropriate response to the detected predefined condition.

* * * * *